US012214911B2

(12) United States Patent
Weathers et al.

(10) Patent No.: US 12,214,911 B2
(45) Date of Patent: Feb. 4, 2025

(54) LOAD COUPLING ATTACHMENT SYSTEMS AND METHODS

(71) Applicant: THE BOEING COMPANY, Chicago, IL (US)

(72) Inventors: Jeffrey Weathers, Huntsville, AL (US); Jacob Szczudlak, Madison, AL (US); Jacob August Hall, Harvest, AL (US)

(73) Assignee: The Boeing Compnay, Chicago, IL (US)

( * ) Notice: Subject to any disclaimer, the term of this patent is extended or adjusted under 35 U.S.C. 154(b) by 688 days.

(21) Appl. No.: 17/392,367

(22) Filed: Aug. 3, 2021

(65) Prior Publication Data

US 2023/0037638 A1     Feb. 9, 2023

(51) Int. Cl.
| | |
|---|---|
| *B64G 1/00* | (2006.01) |
| *B64G 1/40* | (2006.01) |
| *F17C 1/00* | (2006.01) |
| *F17C 1/08* | (2006.01) |
| *F17C 13/00* | (2006.01) |
| *F17C 13/08* | (2006.01) |

(52) U.S. Cl.
CPC .............. *B64G 1/402* (2013.01); *F17C 1/08* (2013.01); *F17C 13/008* (2013.01); *F17C 13/088* (2013.01); *B64G 1/002* (2013.01); *F17C 2203/013* (2013.01); *F17C 2260/016* (2013.01); *F17C 2270/0197* (2013.01)

(58) Field of Classification Search
CPC ............ B60K 15/077; B60K 2015/077; B60K 2015/0344; B60K 2015/0775; B60K 2015/0777; B64G 1/4021; B64G 1/402; B64D 37/08; F17C 2260/016; F17C 2270/0197; F17C 13/008; F17C 13/088
USPC ............ 220/563, 560.07, 560.11; 244/135 R, 244/172.3
See application file for complete search history.

(56) References Cited

U.S. PATENT DOCUMENTS 2,618,448 A * 11/1952 Roger .................... B64D 37/04
                                                            244/123.7
3,508,578 A *  4/1970 Brooks .................. B64G 1/402
                                                            220/563

(Continued)

FOREIGN PATENT DOCUMENTS

| CN | 114044169 A | * | 2/2022 |
| DE | 1243054 B | * | 6/1967 |
| KR | 20090052064 A | * | 5/2009 |

*Primary Examiner* — Allan D Stevens
(74) *Attorney, Agent, or Firm* — Joseph M. Butscher; The Small Patent Law Group LLC

(57) ABSTRACT

A load-decoupling attachment system is configured to secure to a primary structure. The load-decoupling attachment system includes one or more baffle tiers. One or more beams are coupled to the one or more baffle tiers. The one or more beams include a fore end and an aft end. A fore end coupling joint is configured to secure the fore end to a first portion of the primary structure. The fore end coupling joint includes a spherical bearing that allows the fore end to rotate in relation to the first portion of the primary structure. An aft end coupling joint is configured to secure the aft end to a second portion of the primary structure. The aft end coupling joint includes a slot that allows the aft end to linearly translate in relation to the second portion of the primary structure.

20 Claims, 11 Drawing Sheets

(56) References Cited

U.S. PATENT DOCUMENTS

| | | | | |
|---|---|---|---|---|
| 6,220,287 | B1 * | 4/2001 | Wolf | B64G 1/402 |
| | | | | 137/574 |
| 6,571,624 | B1 * | 6/2003 | Grayson | G01F 23/248 |
| | | | | 73/290 R |
| 11,939,086 | B2 * | 3/2024 | Embler | B64G 1/402 |
| 2014/0263841 | A1 * | 9/2014 | Featherstone | B64G 1/002 |
| | | | | 244/171.1 |
| 2015/0360791 | A1 * | 12/2015 | Chevrollier | B64G 1/402 |
| | | | | 244/135 R |
| 2022/0026022 | A1 * | 1/2022 | Ahn | B64G 1/4021 |
| 2022/0258600 | A1 * | 8/2022 | Embler | B64G 1/402 |
| 2024/0102614 | A1 * | 3/2024 | Sakaguchi | B64G 1/4021 |

* cited by examiner

LOAD COUPLING ATTACHMENT SYSTEMS AND METHODS

STATEMENT REGARDING FEDERALLY SPONSORED RESEARCH OR DEVELOPMENT

The invention described herein was made in the performance of work under NASA Contract No. (NNM07AB03C) and is subject to the provisions of Section 305 of the National Aeronautics and Space Act of 1958 (72 Stat.435: 42U.S.C.2457.)

FIELD OF THE DISCLOSURE

Embodiments of the present disclosure generally relate to load-decoupling attachment systems and methods, such as may be used to secure a baffle assembly to a primary tank structure.

BACKGROUND OF THE DISCLOSURE

Various vehicles have numerous components that are connected together. For example, a vehicle may include a frame and a host of different components secured to the frame.

Aeronautical and space vehicles include avionics and propulsion systems. Certain components may be relatively large and massive. During operation, the components may move relative to one another. As such, forces may be translated between the various components.

Structural coupling between a primary load path and system components (for example, avionics, propulsion, and other such components) is analyzed during design stages of air and space vehicles. In vehicles that are subjected to cryogenic temperatures, high pressure tank growth, and large structural deflections (such as space launch vehicles), direct coupling between certain components may create excessive loads between component(s) and other structures.

Further, liquid propellant motion (for example, sloshing) is a phenomenon to consider, particularly in the design of launch vehicles containing liquid propellants, due to the potential effect on the ability to control the launch vehicles. Liquid sloshing is typically mitigated using a system of baffles. For a variety of reasons (for example, limited space, manufacturing limitations, and the like), it may be difficult to design interfaces necessary to support the baffles required for adequate liquid motion damping.

Typically, baffle tiers configured to control or otherwise reduce liquid sloshing (that is, slosh baffle tiers) are attached directly to the wall of a liquid propellant tank through pads and/or nodes with threaded inserts or bonded to an inner mold line of the tank. However, such a design may become impractical in relation to certain applications. For instance, it may not be possible to create the required interface due to manufacturing limitations, or there may not be sufficient space available to support the appropriate number of bonded joints.

SUMMARY OF THE DISCLOSURE

A need exists for an attachment system that decouples load transmission between a component and a primary structure. Further, a need exists for a baffle assembly that spans areas where interfaces are impractical.

With those needs in mind, certain embodiments of the present disclosure provide a load-decoupling attachment system configured to secure to a primary structure. The load-decoupling attachment system includes one or more baffle tiers. One or more beams are coupled to the one or more baffle tiers. The one or more beams include a fore end and an aft end. A fore end coupling joint is configured to secure the fore end to a first portion of the primary structure. The fore end coupling joint includes a spherical bearing that allows the fore end to rotate in relation to the first portion of the primary structure. An aft end coupling joint is configured to secure the aft end to a second portion of the primary structure. The aft end coupling joint includes a slot that allows the aft end to linearly translate in relation to the second portion of the primary structure.

In at least one embodiment, the primary structure is a liquid propellant tank of a launch vehicle. For example, the first portion is a cap of a forward end of the liquid propellant tank, and the second portion is a Y-ring of the liquid propellant tank. As a further example, the liquid propellant tank further includes a plurality of panels between the cap and the Y-ring. The one or more baffle tiers and the one or more beams bridge the plurality of panels between the cap and the Y-ring. As a further example, the fore end coupling joint and the aft end coupling joint are not configured to secure to the plurality of panels.

In at least one example, the fore end coupling joint includes a fitting including a base configured to abut against an internal surface of the primary structure. Lugs extend from the base. The lugs are separated by a gap. The fore end of the beam is disposed within the gap between the lugs. The spherical bearing rotationally couples the lugs to the fore end. In at least one embodiment, one or both of the fitting or the fore end includes the spherical bearing.

In at least one example, the aft end coupling joint includes a fitting including a base configured to abut against an internal surface of the primary structure, and lugs extending from the base. The lugs are separated by a gap. The aft end of the beam is disposed within the gap between the lugs. The slot is formed through the aft end of the beam between the lugs. A pin extends between the lugs and through the slot.

The slot enables linear movement of the aft end of the beam to provide freedom of movement to decouple loads associated with the load-decoupling attachment system and the primary structure.

Certain embodiments of the present disclosure provide a load-decoupling attachment method for a primary structure. The load-decoupling attachment method includes coupling one or more beams to one or more baffle tiers, wherein the one or more beams include a fore end and an aft end; securing, by a fore end coupling joint, the fore end to a first portion of the primary structure, wherein the fore end coupling joint includes a spherical bearing that allows the fore end to rotate in relation to the first portion of the primary structure; and securing, by an aft end coupling joint, the aft end to a second portion of the primary structure, wherein the aft end coupling joint includes a slot that allows the aft end to linearly translate in relation to the second portion of the primary structure.

Certain embodiments of the present disclosure provide a launch vehicle including a primary structure, and a load-decoupling attachment system secured to the primary structure, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide a baffle assembly that is configured to span areas where it may be difficult to create interfaces that react to acceleration and slosh pressure loads. In at least one embodiment, the baffle assembly includes features that accommodate deflections caused by thermal, inertial and pressure loads. By coupling the ability to span large areas of tank area while accommodating tank deflections through specific joint designs, embodiments of the present disclosure are able to take advantage of manufacturing techniques that do not accommodate direct baffle interfaces in certain areas but are nevertheless used to minimize or otherwise reduce the mass of a vehicle.

Certain embodiments of the present disclosure provide a baffle assembly for a propellant tank for a space launch system. The baffle assembly includes one or more baffle tiers secured to a plurality of beams. A fore end coupling joint is located at a fore end of a bracket. The fore end coupling joint includes a spherical bearing. An aft end coupling joint is located at an aft end of the bracket. The aft end coupling joint includes a slot. The fore end coupling joint enables rotational movement at the fore end of the bracket, and the aft end coupling joint enables translational movement at the aft end of the bracket to provide freedom of movement for decoupling loads.

Figure 1:
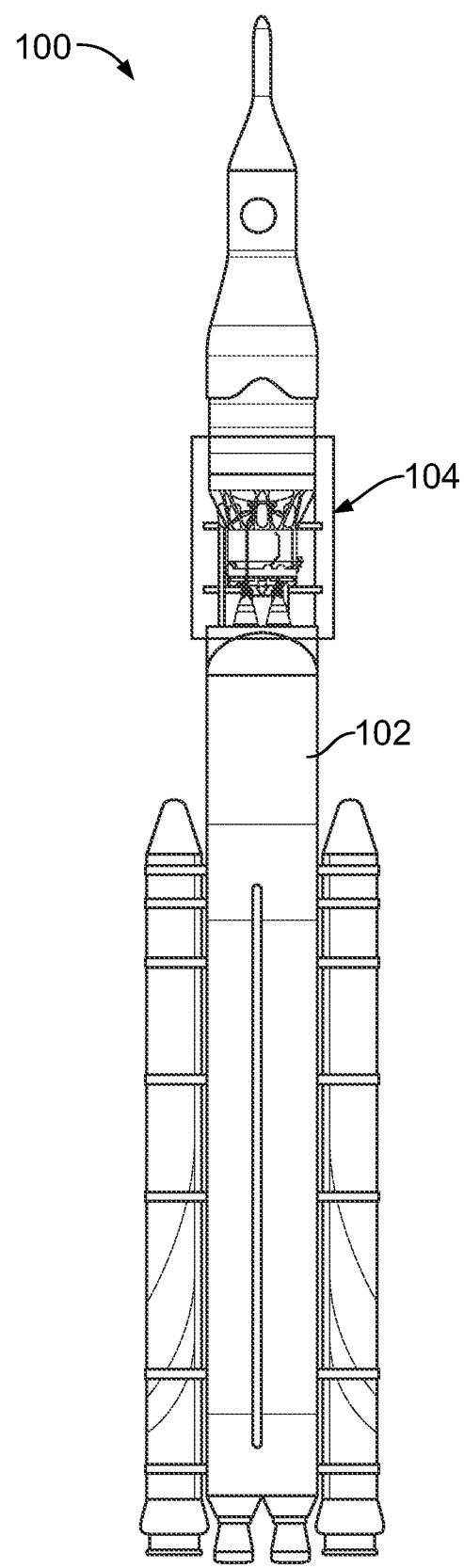
FIG. 1 illustrates a front view of a vehicle, according to an embodiment of the present disclosure.

FIG. 1 illustrates a front view of a vehicle 100, according to an embodiment of the present disclosure. The vehicle 100 is a launch and/or space vehicle, such as a rocket. The vehicle 100 includes an integrally stiffened barrel 102 (a portion shown transparent for clarity), which may surround a portion of a vehicle stage 104. Optionally, embodiments of the present disclosure may be used with various other types of vehicles, such as airplanes, land-based vehicles, watercraft, and/or the like.

Figure 2:
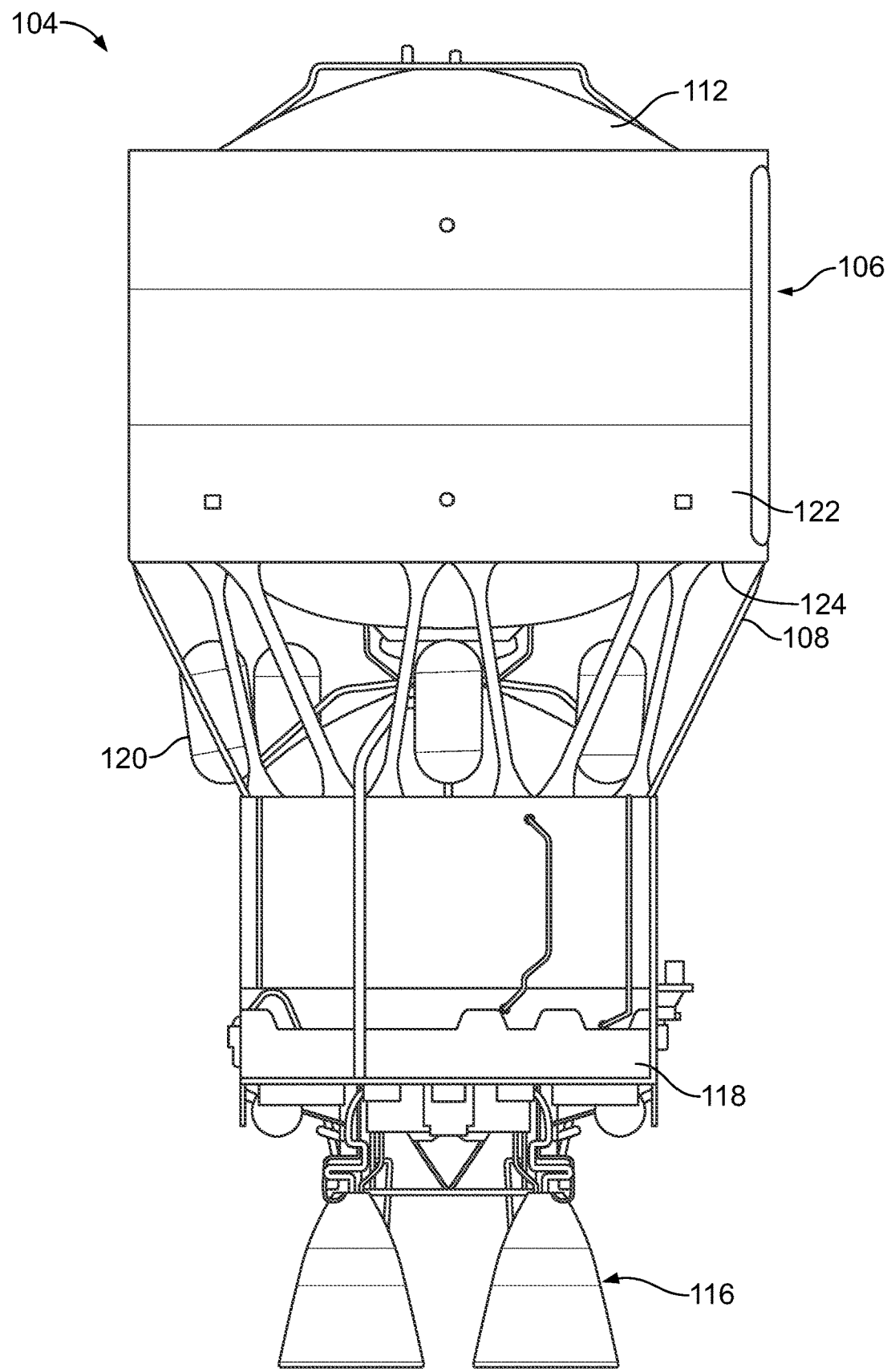
FIG. 2 illustrates a front view of a stage of the vehicle, according to an embodiment of the present disclosure.

FIG. 2 illustrates a front view of the vehicle stage 104, according to an embodiment of the present disclosure. The vehicle stage 104 includes a main body 106, a truss assembly 108 secured to stiffening ring 124 attached to the integrally stiffened barrel 122, a liquid propellant tank 112 (such as tank that retains liquid hydrogen) secured to the stiffening ring 124, and an engine assembly 116 secured to a beam assembly 118. One or more components, such as tanks 120 (for example, Helium tanks) are secured to the truss assembly 108.

Figure 3:
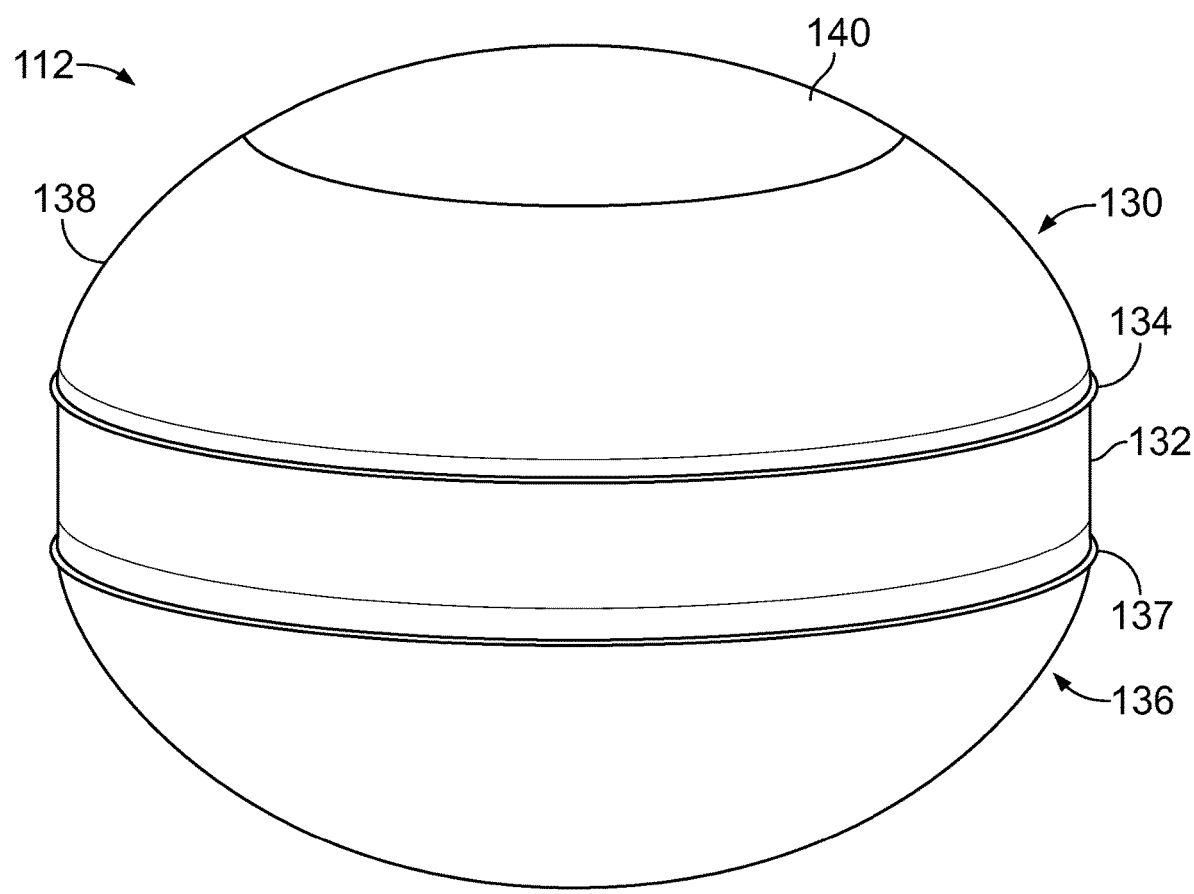
FIG. 3 illustrates a perspective view of a liquid propellant tank, according to an embodiment of the present disclosure.

FIG. 3 illustrates a perspective view of the liquid propellant tank 112, according to an embodiment of the present disclosure. The liquid propellant tank 112 is configured to retain a liquid propellant, such as liquid hydrogen. The liquid propellant tank 112 includes a forward end 130 (such as a forward hemisphere) coupled to a central Y-ring 132. In particular, the forward end 130 is secured to a forward edge 134 of the Y-ring 132. The liquid propellant tank also includes an aft end 136 (such as an aft hemisphere) coupled to the Y-ring 132. In particular, the aft end 136 is secured to an aft edge 137 of the Y-ring 132.

The forward end 130 includes a plurality of panels 138 (such as gore panels) that are meridianally connected together between the Y-ring 132 and a forward cap 140. The panels 138 can be formed of aluminum, for example. In at least one embodiment, ten or more panels 138 are meridianally connected together to form an annular structure between the Y-ring 132 and the cap 140.

Figure 4:
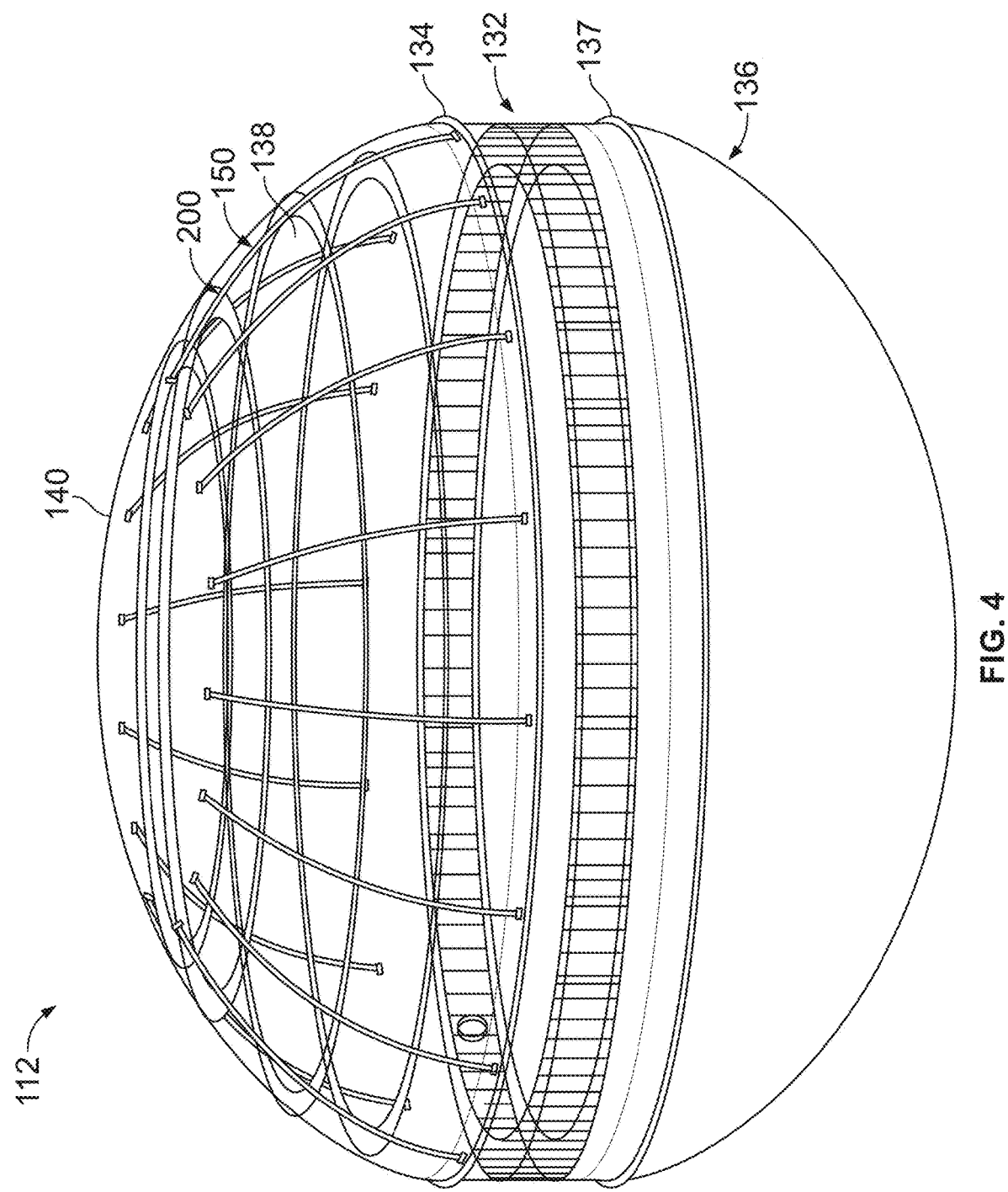
FIG. 4 illustrates a perspective internal view of the liquid propellant tank of FIG. 3.

FIG. 4 illustrates a perspective internal view of the liquid propellant tank 112 of FIG. 3. For the sake of clarity, the forward end 130, the Y-ring 132, and the aft end 136 are transparent in FIG. 4.

In order to control motion of the liquid propellant within the liquid propellant tank 112, a baffle assembly 150 is secured within the forward end 130. The baffle assembly 150 secures between the Y-ring 132 and the cap 140. As described herein, the baffle assembly 150 includes a plurality of fore end coupling joints that connect to the cap 140, and a plurality of aft end coupling joints that connect to the Y-ring 132. In at least one embodiment, neither the fore end coupling joints, nor the aft end coupling joints directly connect to the panels 138. As such, the baffle assembly 150 is secured within the forward end 130 and spans the panels 138 without directly interfacing therewith.

Figure 5:
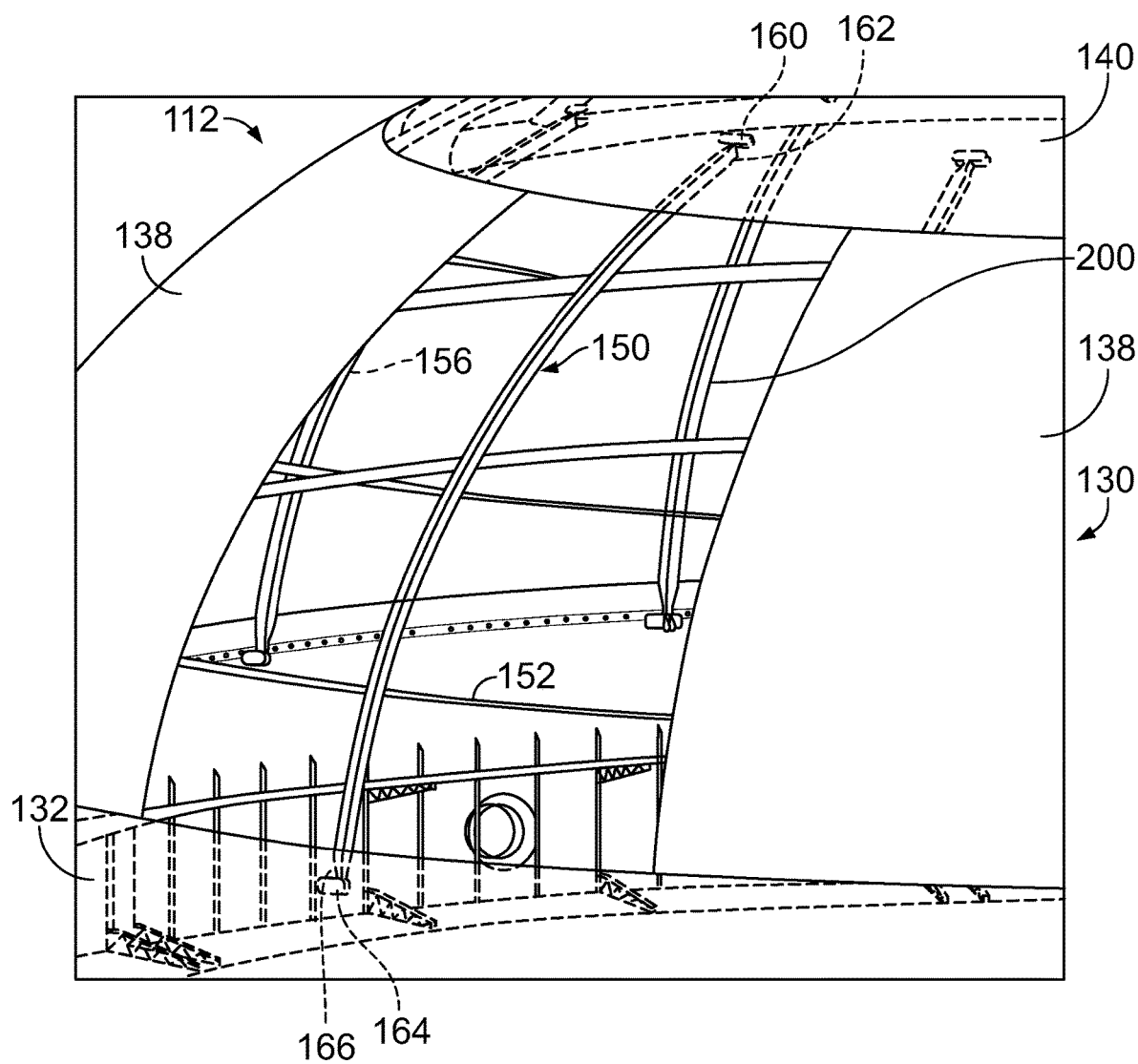
FIG. 5 illustrates a perspective view of a portion of a forward end of the liquid propellant tank with a panel removed to show internal components, according to an embodiment of the present disclosure.

FIG. 5 illustrates a perspective view of a portion of the forward end 130 of the liquid propellant tank 112 with a panel 138 removed to show internal components, according to an embodiment of the present disclosure. The baffle assembly 150 includes a plurality of baffle tiers 152 that circumferentially extend within the forward end 130. The baffle tiers 152 are annular ledges that are configured to control motion of liquid propellant within the forward end 130. For example, the baffle tiers 152 are configured to reduced motion of the liquid propellant in an aft-to-forward direction, and a forward-to-aft direction. In this manner, the baffle tiers 152 are configured to control liquid sloshing within the forward end 130.

The baffle tiers 152 are coupled to a plurality of arcuate beams 154 that are between the baffle tiers 152 and inner surfaces 156 of the panels 138. In at least one embodiment, the beams 154 do not connect to the inner surfaces 156 through couplings. The curve of the arcuate beams 154 may follow and/or conform to the curvature of the inner surfaces 156 of the panels 138.

Instead of having nodes or pads that connect to the inner surfaces 156, the baffle assembly 150 includes a fore end coupling joint 160 at a fore end 162 of each beam 154, and an aft end coupling joint 164 at an aft end 166 of each beam 154. The fore end coupling joint 160 securely connects the fore end 162 to the cap 140, while the aft end coupling joint 164 securely connects the aft end 166 to the Y-ring 132. In this manner, the baffle assembly 150 spans the panels 138 (such as the internal surfaces 156 of the panels 138) without connecting thereto via pads, nodes, or couplings. As such, the panels 138 are able to deflect, such as due to thermal, inertial and pressure loads, without being constrained by couplings to the baffle assembly 150. Moreover, additional baffle tiers 152 can be used, as they are not directly connected to the panels 138. The baffle assembly 150 can include more or less baffle tiers 152 than shown.

Figure 6:
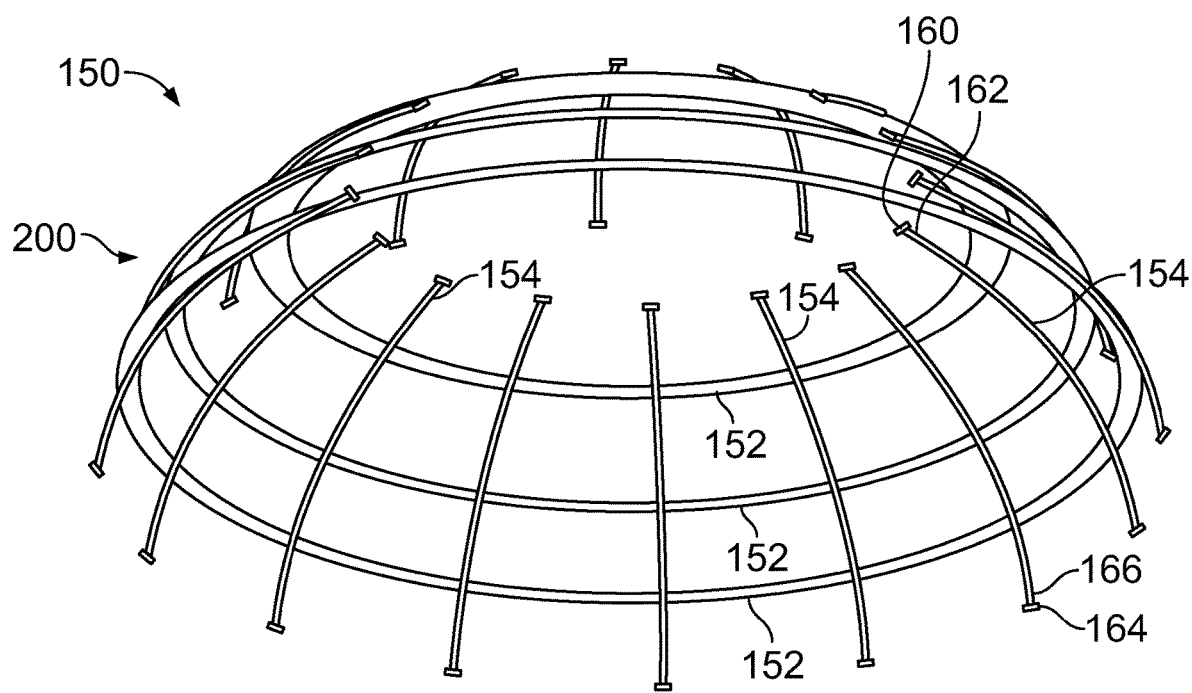
FIG. 6 illustrates a perspective top view of a baffle assembly, according to an embodiment of the present disclosure.

FIG. 6 illustrates a perspective top view of the baffle assembly 150, according to an embodiment of the present disclosure. As noted, the baffle assembly 150 includes the baffle tiers 152 coupled to the beams 154. The baffle assembly 150 can include more or less baffle tiers 152 and more or less beams 154 than shown. The fore end coupling joints 160 are at the fore ends 162 of the beams 154. The aft end coupling joints 164 are at the aft ends 166 of the beams 154.

Figure 7:
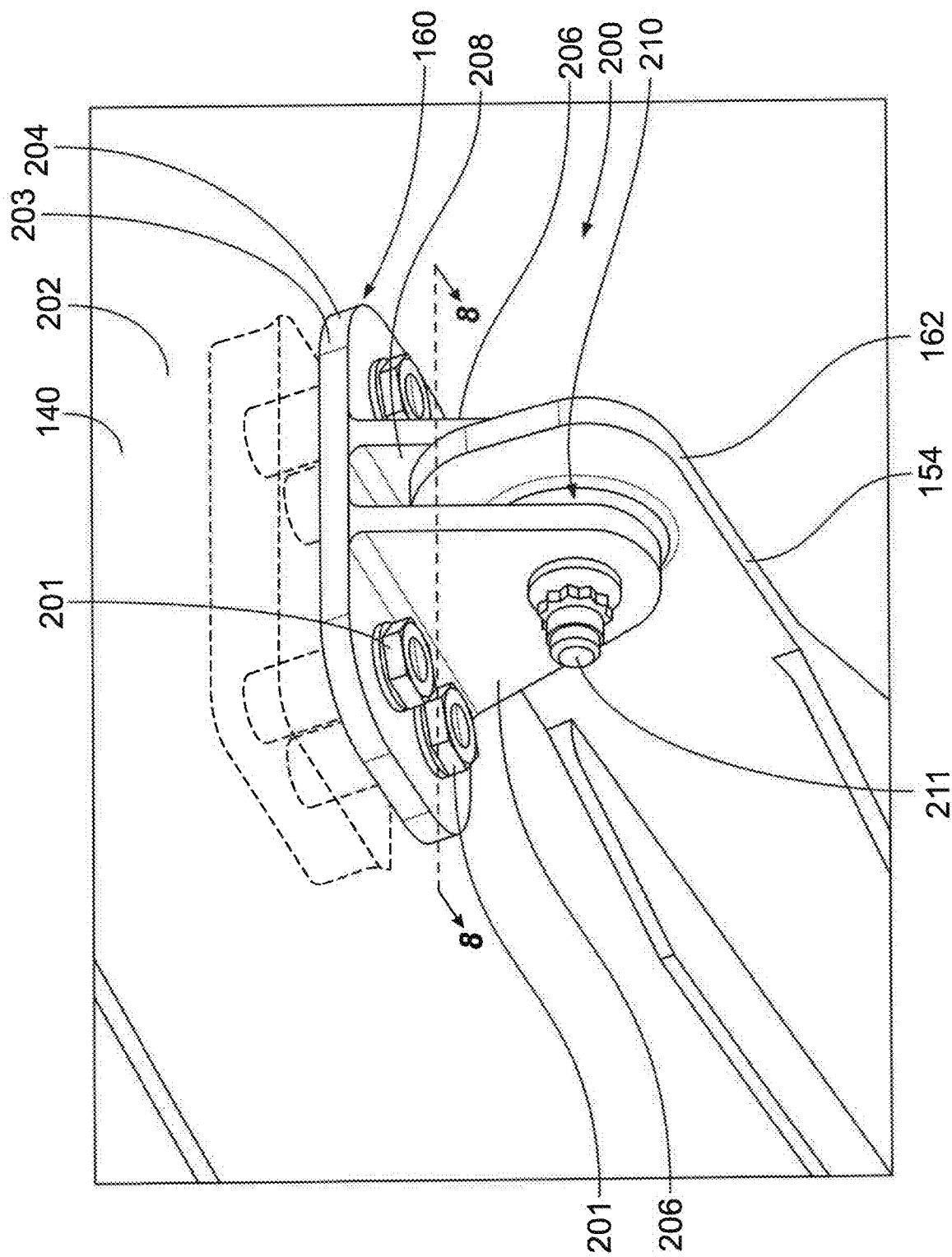
FIG. 7 illustrates a perspective internal view of a fore end coupling joint connected to a fore end of a bracket and an internal surface of a cap, according to an embodiment of the present disclosure.
Figure 8:
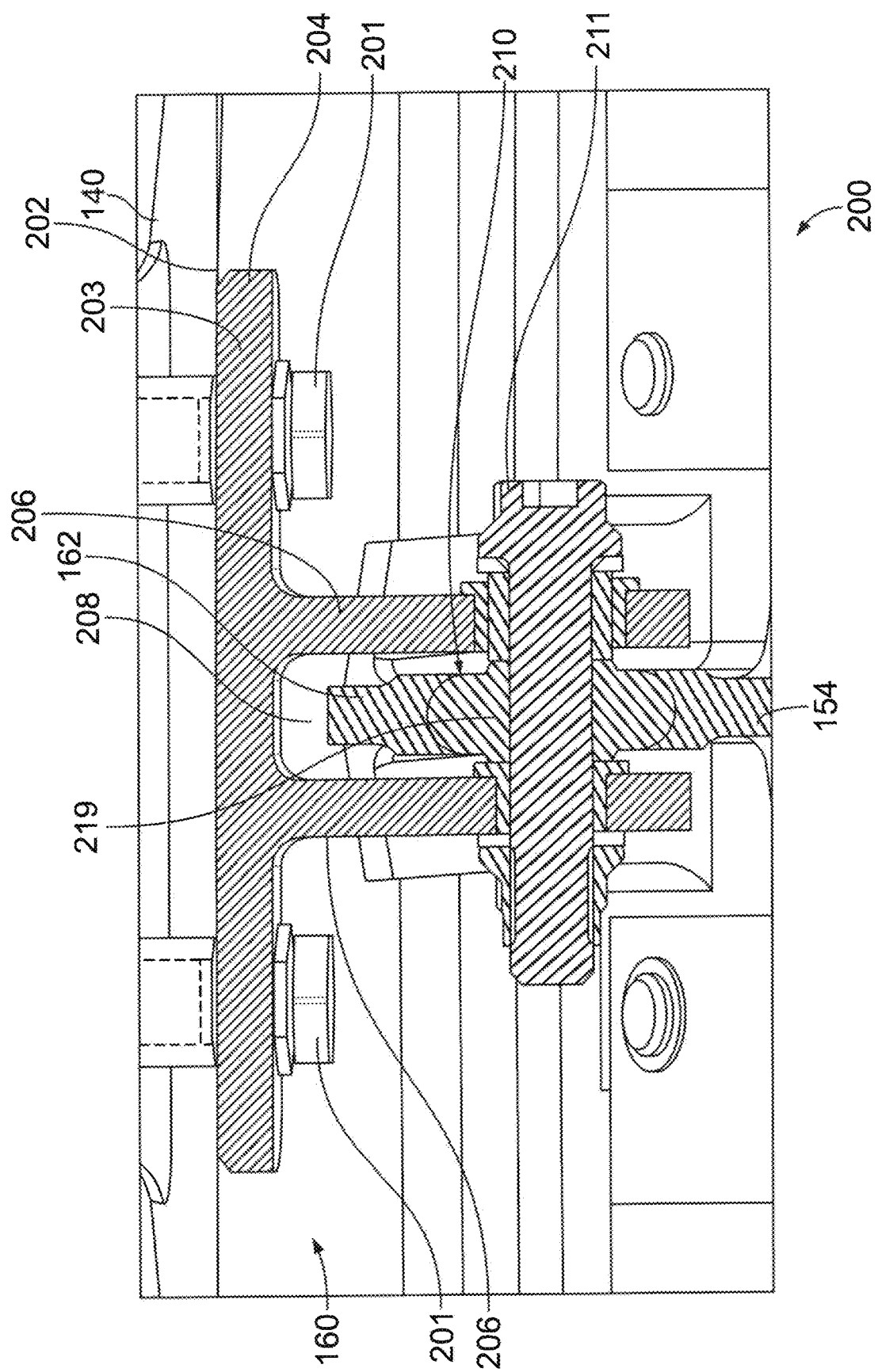
FIG. 8 illustrates a transverse cross-sectional view of the fore end coupling joint through line 8-8 of FIG. 7.

FIG. 7 illustrates a perspective internal view of the fore end coupling joint 160 connected to the fore end 162 of the beam 154 and an internal surface 202 of the cap 140, according to an embodiment of the present disclosure. FIG. 8 illustrates a transverse cross-sectional view of the fore end coupling joint 160 through line 8-8 of FIG. 7. Referring to FIGS. 7 and 8, in at least one embodiment, the fore end coupling joint 160 does not directly connect or otherwise couple to the panels 138 (shown in FIGS. 3-5, for example). The fore end coupling joint 160 includes a fitting 203 (for example, a first or fore fitting), such as a bracket, including a base 204 (for example, a first or fore base) that abuts against the internal surface 202 of the cap 140. The base 204 can be secured to the internal surface 202 through one or more fasteners 201, such as bolts. Two lugs 206 (for example, first or fore lugs, such as mirror image lugs) extend from the base 204, such as inwardly away from the internal surface 202. The lugs 206 are separated by a gap 208 (for example, a first or fore gap). The fore end 162 of the beam 154 is disposed between the lugs 206 within the gap 208. The lugs 206 rotationally couple to the fore end 162 through a spherical bearing 210 having a pin 211 extending therethrough and through the lugs 206. The fore end 162 of the beam 154 is coupled to the spherical bearing 210 in the fore end coupling joint 160, via the pin 211 that is received and secured within a center 219 of the spherical bearing 210 and secured to the lugs 206.

The spherical bearing 210 enables rotational movement of the fore end 162 of the beam 154 relative to the fitting 203. The spherical bearing 210 can be coupled to and/or an integral part of the fitting 203. Optionally, the spherical bearing 210 can be coupled to and/or an integral part of the fore end 162 of the beam 154.

Figure 9:
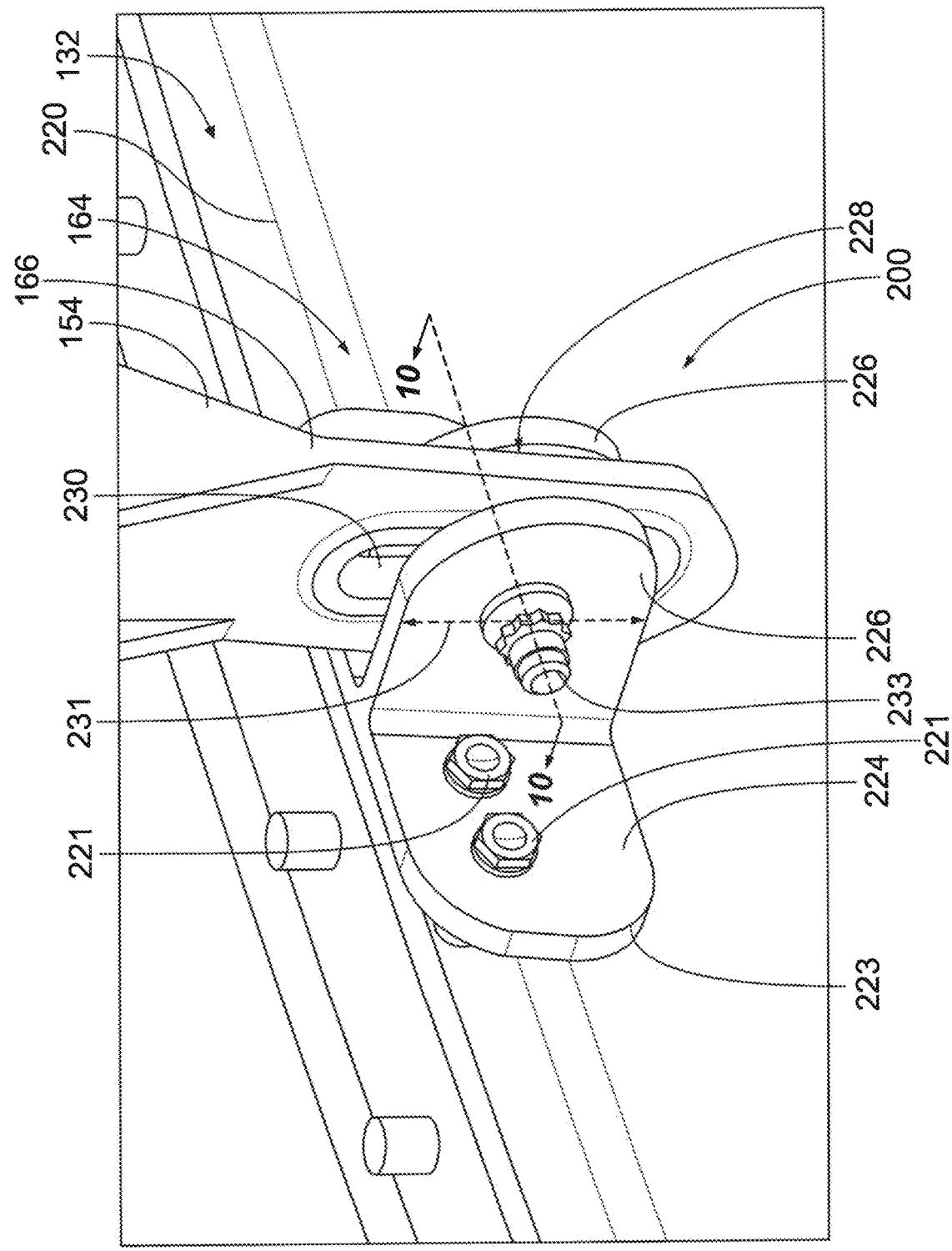
FIG. 9 illustrates a perspective internal view of an aft end coupling joint connected to an aft end of a bracket and an internal surface of a Y-ring, according to an embodiment of the present disclosure.
Figure 10:
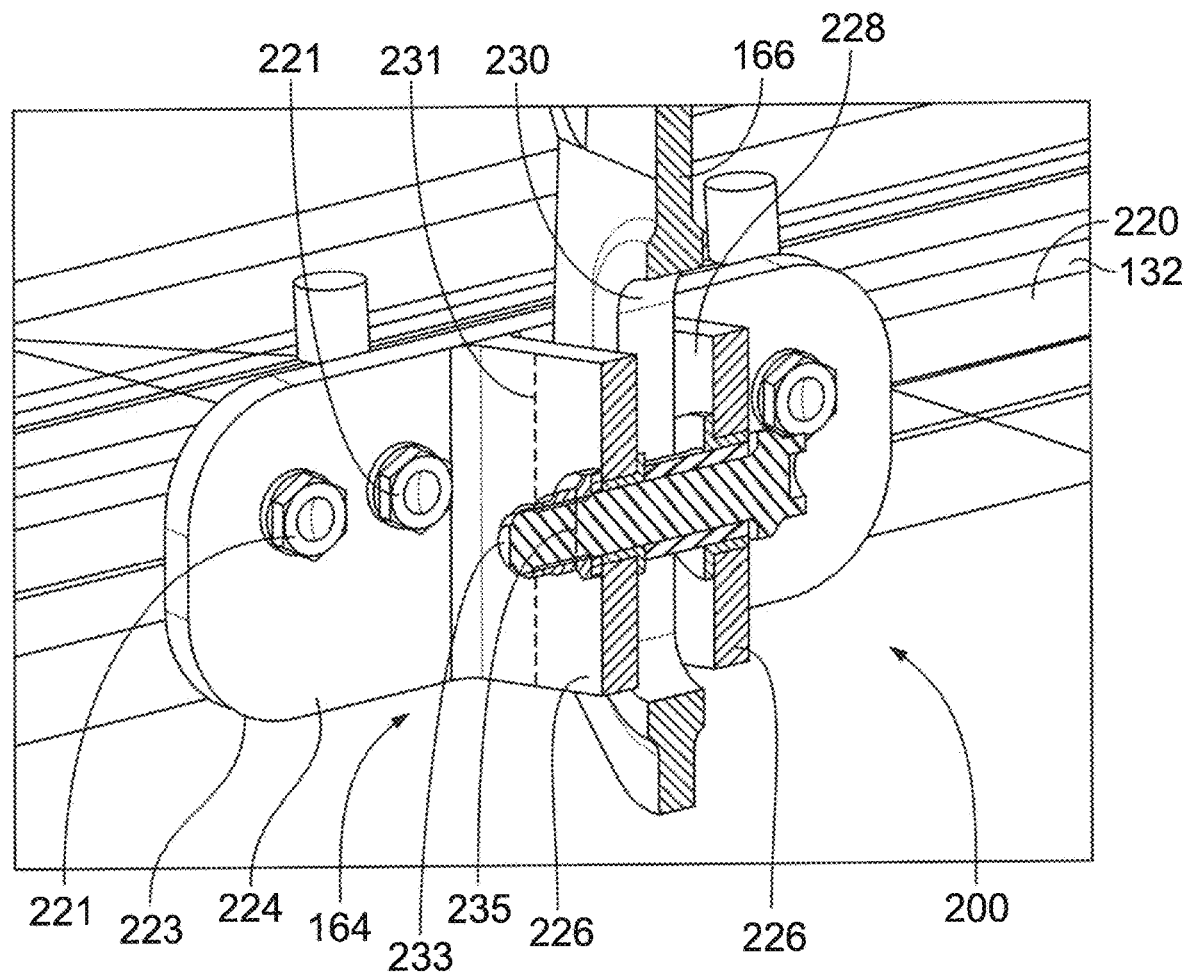
FIG. 10 illustrates a cross-sectional view of the aft end coupling joint through line 10-10 of FIG. 9.

FIG. 9 illustrates a perspective internal view of the aft end coupling joint 164 connected to the aft end 166 of the beam 154 and an internal surface 220 of the Y-ring 132, according to an embodiment of the present disclosure. FIG. 10 illustrates a cross-sectional view of the aft end coupling joint 164 through line 10-10 of FIG. 9. Referring to FIGS. 9 and 10, in at least one embodiment, the aft end coupling joint 164 does not directly connect or otherwise couple to the panels 138 (shown in FIGS. 3-5, for example). The aft end coupling joint 164 includes a fitting 223 (for example, a second or aft fitting), such as a bracket, including a base 224 (for example, a second or aft base) that abuts against the internal surface 220 of the Y-ring 132. The base 224 can be secured to the internal surface 220 through one or more fasteners 221, such as bolts. Two lugs 226 (for example, second or aft lugs, such as mirror image lugs) extend from the base, such as inwardly away from the internal surface 220. The lugs 226 are separated by a gap 228 (for example, a second or aft gap). The aft end 166 of the beam 154 is disposed between the lugs 226 within the gap 228. A slot 230 is formed through the aft end 166 of the beam 154 between the lugs 226. The slot 230 has a length that may be greater than a length 231 of the lugs 226. A pin 233 extends between the lugs 226 and through the slot 230. The slot 230 is greater than a diameter 235 of the pin 233. As such, the pin 233 is able to translate through the slot 230, and therefore the fitting 223 is able to translate relative to the aft end 166 of the beam 154.

The slot 230 enables linear movement of the aft end 166 of the beam 154 relative to the fitting 223 to provide freedom of movement to decouple loads associated with the baffle and loads associated with the liquid propellant tank 112 and the vehicle 100. The aft end coupling joint 164 includes the slot 230, such as may be formed in the aft end 166 of the beam 154. Optionally, a slot 230 can be formed in the fitting 223, such as in each of the lugs 226.

Referring to FIGS. 1-6, a load decoupling attachment system 200 is configured to secure to a primary tank structure, such as the forward end 130 of the liquid propellant tank 112. The load decoupling attachment system 200 includes the baffle assembly 150 including one or more baffle tiers 152 coupled to one or more beams 154. The fore end coupling joint 160 is secured to the fore end 162 of the beam 154. The aft end coupling joint 164 is secured to the aft end 166 of the beam 154.

The fore end coupling joint 160 includes the spherical bearing 210 (such as may be part of one or both of the fitting 203 and/or the fore end 162 of the beam 154). The aft end coupling joint 164 includes the slot 230 (such as formed in the aft end 166 of the bracket 254 or the fitting 223). The fore end coupling joint 160 also couples to the primary structure, such as the cap 140 of the liquid propellant tank 112. The aft end 166 of the beam 154 couples via the pin 233 to the slot 230 of the aft end coupling joint 160, which, in turn, couples to the primary structure, such as the Y-ring 132 of the liquid propellant tank 112.

As described herein, the load-decoupling attachment system 200 is configured to secure to a primary structure (for example, the liquid propellant tank 112). The load-decoupling attachment system 200 includes one or more baffle tiers 152. One or more beams 154 are coupled to the one or more baffle tiers 152. The one or more beams 154 include a fore end 162 and an aft end 166. A fore end coupling joint 160 secures the fore end 162 to a first portion (such as the cap 140) of the primary structure. The fore end coupling joint 160 includes a spherical bearing 210 that allows the fore end 162 to rotate in relation to the first portion of the primary structure. An aft end coupling joint 164 secures the aft end 166 to a second portion (such as the Y-ring 132) of the primary structure. The aft end coupling joint 164 includes a slot 230 that allows the aft end 166 to linearly translate in relation to the second portion of the primary structure.

In at least one embodiment, the fore end coupling joint 160 secures the baffle assembly 150 to the cap 140, while the aft end coupling joint 164 secures the baffle assembly to the Y-ring 132. The fore end coupling joint 160 and the aft end coupling joint 164 do not directly connect or otherwise couples to the panels 138. In this manner, the baffle assembly 150 spans the panels 138 without connecting thereto.

The fore end coupling joints 160 and the aft end coupling joints 164 attach the baffle assembly 150 to the primary structure (for example, the liquid propellant tank 112) such that loads associated with the baffle assembly 150 are decoupled from loads associated with the primary structure.

In at least one embodiment, the primary structure is a propulsion tank, such as the liquid propulsion tank 112, which is part of the space launch vehicle 100. The baffle assembly 150 is configured to inhibit slosh of liquid (such as liquid propellant) within the liquid propulsion tank 112.

The load decoupling attachment system 200 provides the baffle assembly 150 that spans or bridges (for example, does not directly connect thereto, such as through couplings, pads, or nodes) between the Y-ring 132 and the cap 140. The baffle assembly 150 includes one or more fore end coupling joints 160 having a spherical bearing 210 at the fore ends 162 of the beams 154, and aft end coupling joints 164 having slots 230 at the aft ends 166 of the beams 154. The spherical bearings 210 and slots 230 cooperate to provide ease of installation, as well as accommodate deflections of portions of the primary structure (such as the panels 138) that may be caused by thermal, inertial, and pressure loads as the vehicle 100 operates.

Figure 11:
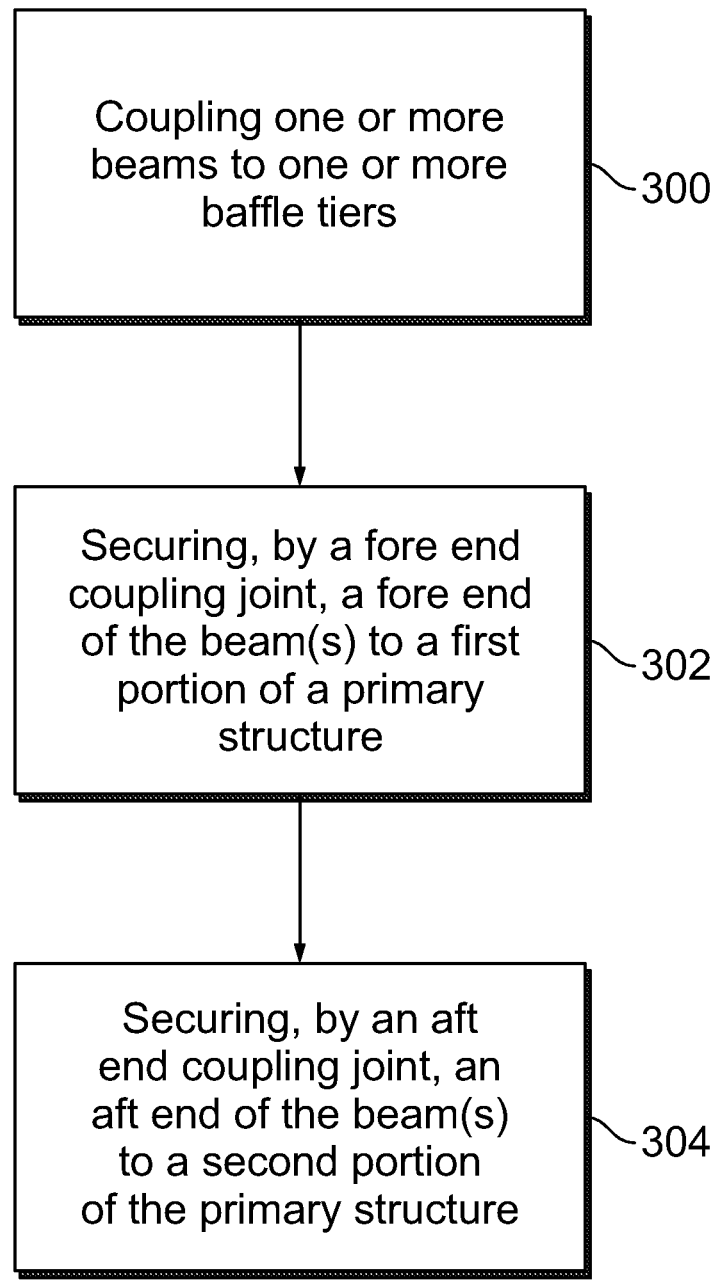
FIG. 11 illustrates a flow chart of a load-decoupling attachment method for a primary structure, according to an embodiment of the present disclosure.

FIG. 11 illustrates a flow chart of a load-decoupling attachment method for a primary structure, according to an embodiment of the present disclosure. Referring to FIGS. 10-11, the load-decoupling attachment method includes coupling, at 300, one or more beams 154 to one or more baffle tiers 152, wherein the one or more beams 154 include a fore end 162 and an aft end 166; securing, at 302, by a fore end coupling joint 160, the fore end 162 to a first portion (such as the cap 140) of the primary structure, wherein the fore end coupling joint 160 includes a spherical bearing 210 that allows the fore end 162 to rotate in relation to the first portion of the primary structure; and securing, at 304, by an aft end coupling joint 164, the aft end 166 to a second portion (such as the Y-ring 132) of the primary structure, wherein the aft end coupling joint 164 includes a slot 230 that allows the aft end 166 to linearly translate in relation to the second portion of the primary structure.

Further, the disclosure comprises embodiments according to the following clauses:

Clause 1: A load-decoupling attachment system configured to secure to a primary structure, the load-decoupling attachment system comprising:
  one or more baffle tiers;
  one or more beams coupled to the one or more baffle tiers, wherein the one or more beams include a fore end and an aft end;
  a fore end coupling joint configured to secure the fore end to a first portion of the primary structure, wherein the fore end coupling joint includes a spherical bearing that allows the fore end to rotate in relation to the first portion of the primary structure; and
  an aft end coupling joint configured to secure the aft end to a second portion of the primary structure, wherein the aft end coupling joint includes a slot that allows the aft end to linearly translate in relation to the second portion of the primary structure.

Clause 2. The load-decoupling attachment system of Clause 1, wherein the primary structure is a liquid propellant tank of a launch vehicle.

Clause 3. The load-decoupling attachment system of Clause 2, wherein the first portion is a cap of a forward end of the liquid propellant tank, and wherein the second portion is a Y-ring of the liquid propellant tank.

Clause 4. The load-decoupling attachment system of Clause 3, wherein the liquid propellant tank further comprises a plurality of panels between the cap and the Y-ring, wherein the one or more baffle tiers and the one or more beams bridge the plurality of panels between the cap and the Y-ring.

Clause 5. The load-decoupling attachment system of Clause 4, wherein the fore end coupling joint and the aft end coupling joint are not configured to secure to the plurality of panels.

Clause 6. The load-decoupling attachment system of any of Clauses 1-5, wherein the fore end coupling joint comprises a fitting including:
  a base configured to abut against an internal surface of the primary structure; and
  lugs extending from the base, wherein the lugs are separated by a gap, wherein the fore end of the beam is disposed within the gap between the lugs, and wherein the spherical bearing rotationally couples the lugs to the fore end.

Clause 7. The load-decoupling attachment system of Clause 6, wherein one or both of the fitting or the fore end comprises the spherical bearing.

Clause 8. The load-decoupling attachment system of any of Clauses 1-7, wherein the aft end coupling joint comprises a fitting including:
  a base configured to abut against an internal surface of the primary structure; and
  lugs extending from the base, wherein the lugs are separated by a gap, wherein the aft end of the beam is disposed within the gap between the lugs, wherein the slot is formed through the aft end of the beam between the lugs, and wherein a pin extends between the lugs and through the slot.

Clause 9. The load-decoupling attachment system of any of Clauses 1-8, wherein the slot enables linear movement of the aft end of the beam to provide freedom of movement to decouple loads associated with the load-decoupling attachment system and the primary structure.

Clause 10. A load-decoupling attachment method for a primary structure, the load-decoupling attachment method comprising:
  coupling one or more beams to one or more baffle tiers, wherein the one or more beams include a fore end and an aft end;
  securing, by a fore end coupling joint, the fore end to a first portion of the primary structure, wherein the fore end coupling joint includes a spherical bearing that allows the fore end to rotate in relation to the first portion of the primary structure; and
  securing, by an aft end coupling joint, the aft end to a second portion of the primary structure, wherein the aft end coupling joint includes a slot that allows the aft end to linearly translate in relation to the second portion of the primary structure.

Clause 11. The load-decoupling attachment method of Clause 10, wherein the primary structure is a liquid propellant tank of a launch vehicle, wherein the first portion is a cap of a forward end of the liquid propellant tank, and wherein the second portion is a Y-ring of the liquid propellant tank.

Clause 12. The load-decoupling attachment method of Clause 11, wherein a plurality of panels are between the cap and the Y-ring, wherein the one or more baffle tiers and the one or more beams bridge the plurality of panels between the cap and the Y-ring, and wherein the fore end coupling joint and the aft end coupling joint are not configured to secure to the plurality of panels.

Clause 13. A launch vehicle comprising:
a primary structure; and
a load-decoupling attachment system secured to the primary structure, the load-decoupling attachment system comprising:
one or more baffle tiers;
one or more beams coupled to the one or more baffle tiers, wherein the one or more beams include a fore end and an aft end;
a fore end coupling joint securing the fore end to a first portion of the primary structure, wherein the fore end coupling joint includes a spherical bearing that allows the fore end to rotate in relation to the first portion of the primary structure; and
an aft end coupling joint securing the aft end to a second portion of the primary structure, wherein the aft end coupling joint includes a slot that allows the aft end to linearly translate in relation to the second portion of the primary structure.

Clause 14. The launch vehicle of Clause 13, wherein the primary structure is a liquid propellant tank.

Clause 15. The launch vehicle of Clause 14, wherein the first portion is a cap of a forward end of the liquid propellant tank, and wherein the second portion is a Y-ring of the liquid propellant tank.

Clause 16. The launch vehicle of Clause 15, wherein the liquid propellant tank further comprises a plurality of panels between the cap and the Y-ring, wherein the one or more baffle tiers and the one or more beams bridge the plurality of panels between the cap and the Y-ring.

Clause 17. The launch vehicle of Clause 16, wherein the fore end coupling joint and the aft end coupling joint do not secure to the plurality of panels.

Clause 18. The launch vehicle of any of Clauses 13-17, wherein the fore end coupling joint comprises a fitting including:
a first base abutting against a first portion of an internal surface of the primary structure; and
first lugs extending from the first base, wherein the first lugs are separated by a first gap, wherein the fore end of the beam is disposed within the first gap between the first lugs, and wherein the spherical bearing rotationally couples the first lugs to the fore end.

Clause 19. The launch vehicle of Clause 18, wherein the aft end coupling joint comprises a fitting including:
a second base configured to abut against a second portion of the internal surface of the primary structure; and
second lugs extending from the second base, wherein the second lugs are separated by a second gap, wherein the aft end of the beam is disposed within the second gap between the second lugs, wherein the slot is formed through the aft end of the beam between the second lugs, and wherein a pin extends between the second lugs and through the slot.

Clause 20. The launch vehicle of any of Clauses 13-19, wherein the slot enables linear movement of the aft end of the beam to provide freedom of movement to decouple loads associated with the load-decoupling attachment system and the primary structure.

As described herein, embodiments of the present disclosure provide attachments systems and methods that decouple load transmission between a component, such as a baffle assembly, and a primary structure, such as a liquid propellant tank. Further, embodiments of the present disclosure provide a baffle assembly that spans areas, such as panels, where interfaces are impractical.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A load-decoupling attachment system configured to secure to a primary structure, the load-decoupling attachment system comprising:
one or more baffle tiers;
one or more beams coupled to the one or more baffle tiers, wherein the one or more beams include a fore end and an aft end;
a fore end coupling joint configured to secure the fore end to a first portion of the primary structure, wherein the fore end coupling joint includes a spherical bearing that allows the fore end to rotate in relation to the first portion of the primary structure; and
an aft end coupling joint configured to secure the aft end to a second portion of the primary structure, wherein the aft end coupling joint includes a slot that allows the aft end to linearly translate in relation to the second portion of the primary structure.

2. The load-decoupling attachment system of claim 1, wherein the fore end coupling joint comprises a fitting including:
a base configured to abut against an internal surface of the primary structure; and
lugs extending from the base, wherein the lugs are separated by a gap, wherein the fore end of the beam is disposed within the gap between the lugs, and wherein the spherical bearing rotationally couples the lugs to the fore end.

3. The load-decoupling attachment system of claim 2, wherein one or both of the fitting or the fore end comprises the spherical bearing.

4. The load-decoupling attachment system of claim 1, wherein the aft end coupling joint comprises a fitting including:
a base configured to abut against an internal surface of the primary structure; and
lugs extending from the base, wherein the lugs are separated by a gap, wherein the aft end of the beam is disposed within the gap between the lugs, wherein the slot is formed through the aft end of the beam between the lugs, and wherein a pin extends between the lugs and through the slot.

5. The load-decoupling attachment system of claim 1, wherein the slot enables linear movement of the aft end of the beam to provide freedom of movement to decouple loads associated with the load-decoupling attachment system and the primary structure.

6. A load-decoupling attachment method for a primary structure, the load-decoupling attachment method comprising:
coupling one or more beams to one or more baffle tiers, wherein the one or more beams include a fore end and an aft end;
securing, by a fore end coupling joint, the fore end to a first portion of the primary structure, wherein the fore end coupling joint includes a spherical bearing that allows the fore end to rotate in relation to the first portion of the primary structure; and
securing, by an aft end coupling joint, the aft end to a second portion of the primary structure, wherein the aft end coupling joint includes a slot that allows the aft end to linearly translate in relation to the second portion of the primary structure.

7. The load-decoupling attachment method of claim 6, wherein the primary structure is a liquid propellant tank of a launch vehicle.

8. The load-decoupling attachment method of claim 7, wherein the first portion is a cap of a forward end of the liquid propellant tank.

9. The load-decoupling attachment method of claim 8, wherein the second portion is a Y-ring of the liquid propellant tank.

10. The load-decoupling attachment method of claim 9, wherein a plurality of panels are between the cap and the Y-ring.

11. The load-decoupling attachment method of claim 10, wherein the one or more baffle tiers and the one or more beams bridge the plurality of panels between the cap and the Y-ring.

12. The load-decoupling attachment method of claim 11, wherein the fore end coupling joint and the aft end coupling joint are not configured to secure to the plurality of panels.

13. A launch vehicle comprising:
a primary structure; and
a load-decoupling attachment system secured to the primary structure, the load-decoupling attachment system comprising:
one or more baffle tiers;
one or more beams coupled to the one or more baffle tiers, wherein the one or more beams include a fore end and an aft end;
a fore end coupling joint securing the fore end to a first portion of the primary structure, wherein the fore end coupling joint includes a spherical bearing that allows the fore end to rotate in relation to the first portion of the primary structure; and
an aft end coupling joint securing the aft end to a second portion of the primary structure, wherein the aft end coupling joint includes a slot that allows the aft end to linearly translate in relation to the second portion of the primary structure.

14. The launch vehicle of claim 13, wherein the primary structure is a liquid propellant tank.

15. The launch vehicle of claim 14, wherein the first portion is a cap of a forward end of the liquid propellant tank, and wherein the second portion is a Y-ring of the liquid propellant tank.

16. The launch vehicle of claim 15, wherein the liquid propellant tank further comprises a plurality of panels between the cap and the Y-ring, wherein the one or more baffle tiers and the one or more beams bridge the plurality of panels between the cap and the Y-ring.

17. The launch vehicle of claim 16, wherein the fore end coupling joint and the aft end coupling joint do not secure to the plurality of panels.

18. The launch vehicle of claim 13, wherein the fore end coupling joint comprises a fitting including:
a first base abutting against a first portion of an internal surface of the primary structure; and
first lugs extending from the first base, wherein the first lugs are separated by a first gap, wherein the fore end of the beam is disposed within the first gap between the first lugs, and wherein the spherical bearing rotationally couples the first lugs to the fore end.

19. The launch vehicle of claim 18, wherein the aft end coupling joint comprises a fitting including:

a second base configured to abut against a second portion of the internal surface of the primary structure; and second lugs extending from the second base, wherein the second lugs are separated by a second gap, wherein the aft end of the beam is disposed within the second gap between the second lugs, wherein the slot is formed through the aft end of the beam between the second lugs, and wherein a pin extends between the second lugs and through the slot.

20. The launch vehicle of claim 13, wherein the slot enables linear movement of the aft end of the beam to provide freedom of movement to decouple loads associated with the load-decoupling attachment system and the primary structure.

\* \* \* \* \*